United States Patent
Nielsen et al.

[15] 3,672,017
[45] June 27, 1972

[54] HELICAL BLADE MILLING CUTTER

[72] Inventors: Waldemar R. Nielsen, Ojai; Charles D. Mathias, Goleta, both of Calif.

[73] Assignee: Industrial Tools, Inc., Ojai, Calif.

[22] Filed: June 15, 1970

[21] Appl. No.: 46,031

[52] U.S. Cl. ................................................29/105
[51] Int. Cl. ................................................B26d 1/12
[58] Field of Search ..............................29/105, 105 A

[56] References Cited

UNITED STATES PATENTS

| | | |
|---|---|---|
| 2,229,112 | 1/1941 | Miller et al. ........................29/105 |
| 2,207,909 | 7/1940 | BeSaw ...............................29/105 |
| 2,499,994 | 3/1950 | Hart ..................................29/105 |
| 2,257,169 | 9/1941 | Hopps ...............................29/105 |
| 2,188,743 | 1/1940 | Severson ...........................29/105 |
| 2,331,555 | 10/1943 | Jostich, Jr. et al. ...............29/105 |
| 3,200,474 | 8/1965 | Kralowetz .........................29/105 |

FOREIGN PATENTS OR APPLICATIONS

| | | |
|---|---|---|
| 879,870 | 10/1961 | Great Britain .....................29/105 |
| 1,016,093 | 9/1967 | Germany ...........................29/105 |

Primary Examiner—Harrison L. Hinson
Attorney—Pastoriza & Kelly

[57] ABSTRACT

A helical blade milling cutter has a plurality of spiral slots formed in the tool body periphery for retaining helical cutter blades. Retaining sockets open into each slot and are shaped to position clamps. Each clamp has a cylindrically shaped block with a edge shaped face formed with a pair of tapered locking ribs separated by a shallow recess and an adjustment element which may be moved to simultaneously force the block into its associated socket and urge the locking ribs into tight, tow-point or two line locking engagement against the blade.

1 Claim, 6 Drawing Figures

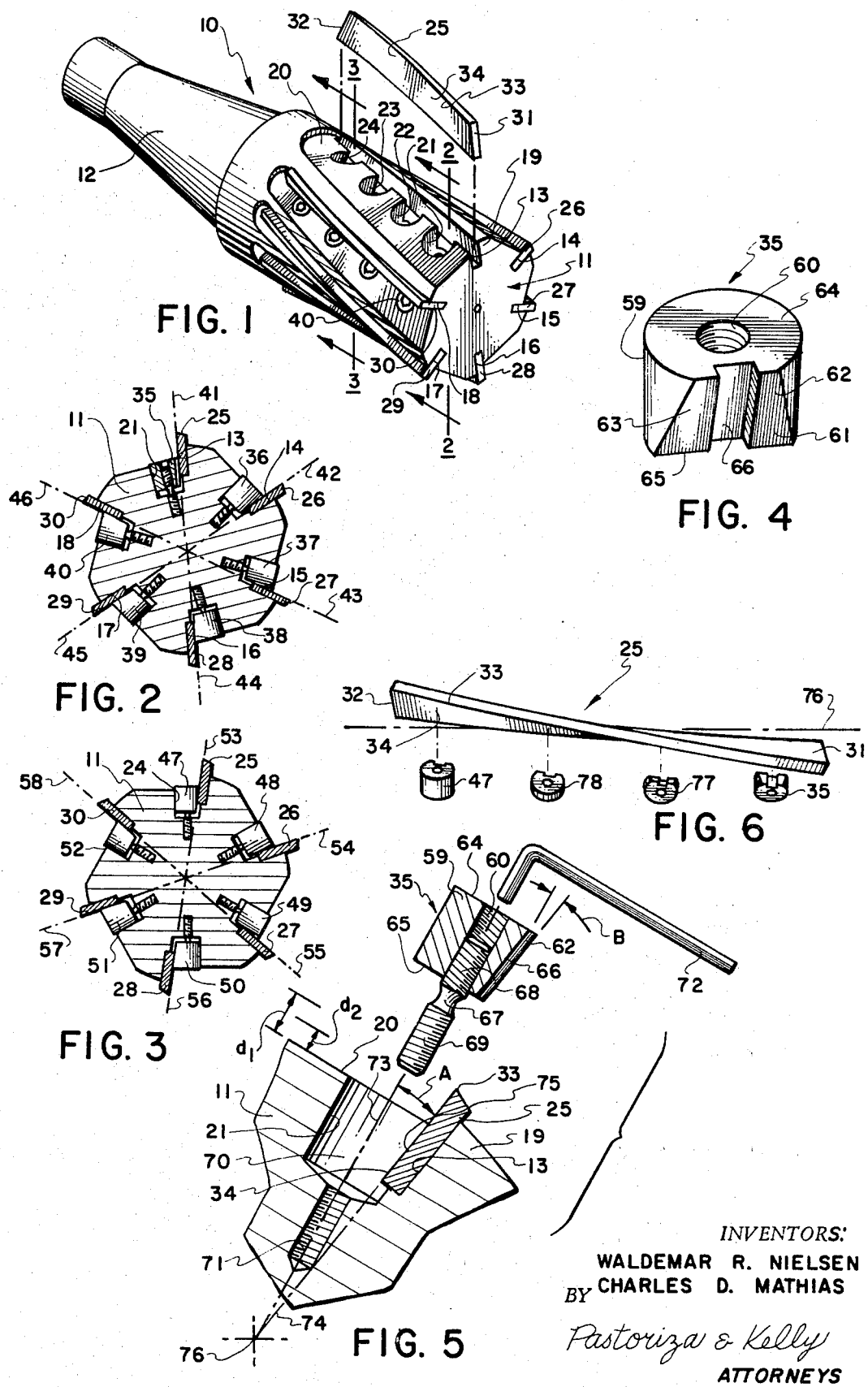

HELICAL BLADE MILLING CUTTER

BACKGROUND OF THE INVENTION:

This invention relates to a clamping mechanism and more specifically to a clamping arrangement for securing multiple helical blades against the tool body of a milling cutter.

It is necessary in precision machining work with milling cutters, for example, to accurately position a cutter blade and hold it in place against the tool body in order to stop lateral, radial and endwise shifting of the blade in reaction to thrust generated during cutting action. Conventional clamping arrangements have either been simple and unreliable or complex and expensive.

One conventional way to lock cutter blades into elongated holding slots of a cutter body involves the tightening down of cylindrically shaped locking plugs or blocks formed with wedge faces into sockets aligned adjacent the holding slots until the wedge faces bear against the cutter blades. As disclosed in U.S. Pat. No. 2,229,112 to Miller et al., the wedge bearing surfaces and blade faces may both be flat or both formed with complementary serrations.

A common technique for clamping helical blades into milling cutter bodies involves employing one or more intermediate wedge pieces or backing plates which when shifted by tightening screws urge the associated helical blade into position. As demonstrated by U.S. Pat. No. 2,188,743 to Severson adjacent blades and backing plates may be serrated to accomplish special locking results.

The use in milling cutter technology of backing plates against which carbide helical blades are brazed is common. While satisfactory for some purposes, this approach is accompanied by the drawbacks that brazing tends to create harmful stresses, material cracks and molecular deterioration in carbide blades.

SUMMARY OF THE INVENTION

Briefly stated this invention comprehends a helical blade milling cutter incorporating a clamping arrangement for securely holding multiple helical blades in slots wherein the clamping action can be released for removing or adjusting the positions of the blades.

The helical blade milling cutter in its broadest aspects has a tool body whose external periphery is formed with a plurality of equidistantly spaced and spirally aligned holding slots, and fluted sections formed adjacent corresponding holding slots. At least two retaining socket are formed in each fluted section and they open into their associated holding slots. Clamps sized for positioning in their retaining sockets are structure to securely hold in place helical shaped cutter blades inserted in the holding slots. Each clamp is characterized by a block with a wedge shaped space defining a pair of tapered locking ribs separated by a shallow recess and an adjustment element positioned to simultaneously force the block into its socket and urge the locking ribs into tight clamping engagement against the blade.

The block component of each clamp is of cylindrical shape and formed with a centrally extending threaded opening. Each socket has an outer enlarged diameter bore and an inner smaller diameter tapped bore. The adjustment elements are double threaded screws having a top section with threads oriented in one direction for engagement with the block threaded opening and a lower section with threads oriented in the opposite direction for engagement with the socket tapped bore. When the clamps are tightened into binding engagement with the blades the spaced locking ribs of each clamp effect a two-point or two line engagement, against the associated blade segment for improved stability.

The axis of each adjustment element intersects the tool body longitudinal axis. Each helical shaped cutter blade is configured so that at any point along its end-to-end length a straight line oriented perpendicular to the blade top edge and laying across the blade cutting face will intersect the tool body longitudinal axis. By constructing the helical blade milling cutter so that both the axes of the adjustment elements and the above mentioned straight lines passing through the blade cutting faces mutually intersect at the tool body longitudinal axis, greatly improved stability results. The tapered angles of the locking ribs of each clamp may be slightly varied to accommodate the blade curvature.

BRIEF DESCRIPTION OF THE DRAWINGS

The numerous benefits and unique aspects of the present invention will be fully understood when the following detailed description is studied in conjunction with the drawings in which:

FIG. 1 is a perspective, partially exploded view of a helical blade milling cutter constructed in accordance with this invention, showing a helical blade removed from its retaining slot and a row of retaining sockets adjacent the slot;

FIG. 2 is a cross sectional view of a completely assembled milling cutter taken along line 2—2 of FIG. 1, showing that the axes of the clamps and perpendicular lines lying in the front faces of the cutter blades all intersect at the longitudinal center line of the milling cutter;

FIG. 3 is a cross sectional view similar to that of FIG. 2 taken along line 3—3 of FIG. 1, showing proximal segments of the helical blades angularly displaced with regard to the distal segments viewed in FIG. 2;

FIG. 4 is a perspective view of a component of a clamp, showing a block having a wedge shaped face formed with a pair of spaced tapered locking ribs;

FIG. 5 is an exploded, fragmentary, sectional view showing a clamp and associated socket and wrench for urging the clamp against the helical blade; and, FIG. 6 is an exploded view of a helical blade removed from its retaining slot and a series of clamps removed laterally away from the blade to show their varying clamping positions.

DETAILED DESCRIPTION OF THE PREFERRED EMBODIMENTS

Referring now to FIG. 1, a helical blade rotary cutting tool 10 such as a milling cutter has a tool body 11 of general cylindrical shape and a rearwardly located tapered shank 12 that may be coupled to a milling machine spindle in the customary manner. Formed in the outer periphery of tool body 11 are a plurality of equiangularly spaced and helically shaped retaining slots 13, 14, 15, 16, 17 and 18. The back wall of each slot, such as holding slot 13, is defined in part by a relatively raised abutment wall 19 and the front wall of holding slot 13 is defined in part by a fluted section 20. The front wall of slot 13 is interrupted at equally spaced positions along its length by a series of cylindrically shaped sockets 21, 22, 23, 24 that are generally radially oriented relative to the axis of tool body 11.

A plurality of carbide helical cutter blades 25, 26, 27, 28, 29 and 30 are shaped for being removably inserted into their associated holding slots 13, 14, 15, 16, 17 and 18. The blades may be snugly inserted in place by slipping them endwise along spiral paths to their set positions. Helical blade 25 which is typical of the other blades has an outer end 31, an inner end 32, an upper exposed edge 33 and a lower edge 34. Blade 25 has a constant end-to-end thickness to facilitate its close tolerance positioning within slot 13 that is characterized by a rectangular cross section. The distance between edges 33 and 34 is constant from end 31 to end 32.

FIG. 2 is a cross sectional view through the most distal ring of clamps 35, 36, 37, 38, 39, and 40 whose axes are importantly shown as radial lines extending from the longitudinal center line of tool body 11. Lines 41, 42, 43, 44, 45 and 46 are straight radial lines aligned perpendicular with the upper and lower edges of segments of helical blades 25, 26, 27, 28, 29 and 30 and lying in the front or cutting faces of the blades. It should be noted therefore that the axes of clamp 35 and the line perpendicular to the adjacent blade segment of blade 25 mutually intersect at the axis of tool body 11. The axes of the other clamps likewise mutually intersect with lines passing perpendicularly through adjacent blade segments at the tool body axis. By constructing the rotary cutting tool 10 so that these lines all intersect at the center line of tool body 11 a more stable clamping arrangement is effected, stress during cutting operations is more evenly distributed and ascertainable, and, fabrication and assembly techniques are facilitated.

FIG. 3 is a cross sectional view through the most proximal ring of clamps 47, 48, 49, 50, 51 and 52 which are in rows with clamps 41, 42, 43, 44, and 46 respectively. Again the axes of these clamps mutually intersect with lines 53, 54, 55, 56, 57 and 58 passing perpendicularly across the blade segment edges and lying in the blade segments at the center of tool body 11. It should be noted that the axes of all the clamps pass through the tool body center line all lines perpendicular to blade edges and lying in the front or cutting faces of the blades at any location along the end-to-end segments adjacent length of the blades pass through the center line of tool body 11. The angular displacement between the segments of blades shown in FIG. 2 and the segments of the blades shown in FIG. 3 is dictated by cutting requirements and may for example be 10°.

Referring now to FIG. 4 clamp 35, which is identical with the other clamps used in the overall clamping arrangement, has a generally cylindrical shaped block 59 with a central threaded opening 60 and a wedge shaped face 61. Wedge shaped face 61 is characterized by a pair of tapered locking ribs 62 and 63 which are slanted or inclined inwardly from top wall 64 to bottom wall 65. Locking ribs 62 and 63 are separated by a rectangular shaped relatively shallow recess 66.

If the wedge face 61 was perfectly flat as is the case with related conventional clamps then upon driving the clamp into binding engagement with the associated cutting blade only a single point or small area contact would result. As a consequence, intensive stress concentration would tend to deteriorate the components at the metal-to-metal interface. Furthermore, single point locking contact against a blade tends to be unstable and may loosen to a point where chatter and fatigue occur. These problems are eliminated by locking ribs 62 and 63 which establish at least two-point contact to rigidly clamp the helical blade.

Since each helical blade twists or curves along its length, dual or two line contact for additional stability may be achieved by inclining locking ribs 62 and 63 at slightly different angles to match the respective bearing sections of the adjacent blade segment. Therefore, it is contemplated to have locking ribs 62 and 63 aligned in coplanar relationship under which condition at least two-point contact will be effected or, alternatively, the locking ribs 62 and 63 may be differently sloped by the sufficient small degree to establish two line contact with the adjacent helical blade segment.

Referring now to FIG. 5 each clamp 35 is constituted by the wedge shaped block 59 and a double threaded adjustment screw 67. Screw 67 has a top threaded section 68 for interengaging opening threads 60 of block 59 and a bottom threaded section 69. Associated retaining socket 21 has an outer larger diameter bore 70 whose walls are shaped to snugly receive block 59 and an inner smaller diameter of bore 71 threaded to interengage with threaded section 69. Inasmuch as screw section 69 has right hand threads and screw section 68 has left hand threads, when a wrench 72 is inserted within a matching opening in the head of screw 67 and torqued the screw 67 will simultaneously anchor clamp 35 in socket 70 and assist in thrusting block 59 against blade 25. As clamp 35 is pulled into its socket 21 the walls of bore 70 cam block 59 against blade 25 until the two locking ribs 62 and 63 establish tight clamping engagement against blade face 75.

The clamping-blade intersection angle A between the axis of clamp 35 and the line 75 (which is perpendicular to the upper edge 33 and lower edge 34 of blade 25 and lies within the front face 75) is preferably between 7° and 15°. Axis line 73 and line 74 intersect on the longitudinal center line 76 of tool body 11. If angle A were smaller than 7° there would be a concomitant tendency by the clamp 35 to become self-locking and too tight to easily release. Conversely, this would necessitate much larger clamps and time consuming material removal operations for the sockets whose sizes would tend to weaken the stress-absorption qualities of tool body 11.

In situations where the tapered locking ribs 62 and 63 are desired to be oriented in co-planar relationship the angle B would be equal with the Angle A. However, where it is desired to force locking ribs 62 and 63 to clampingly engage front face 75 with two line contact, the angle B for locking rib 62 would be slightly steeper than the angle A, and, the angle B for locking rib 63 would be slightly shallower than angle A.

The radial distance $d_1$ between fluted section 20 and blade top edge 33 is approximately twice the length of the radial distance $d_2$ between fluid section 20 and the top of abutment wall 19. Distance $d_1$ is purposely considerably shallower than the ordinary distance in conventional milling cutters so that the metal chips being cut or sliced from a workpiece will break relatively soon and therefore demand less power from the machine. In conventional milling cutters the height of the blade cutting face is approximately 200 to 300 times the thickness or gauge of a chip that is approximately 0.006 inches. In this invention height $d_1$ of the exposed portion of cutting face 75 is only between 30 and 50 times the average chip thickness and therefore will cause breakage of a chip after it has curled through one-half to 2 wraps rather than the usual five to six wraps. When the cutting blade exposed portion is relatively deep then there is considerable space above the fluted section within which to form numerous wraps and thereby consume extra power from the machine that otherwise could be directed towards rotating the cutting tool. Because by the arrangement of this invention the height $d_1$ of the cutting exposed face is relatively shallow the diameter of the chip will be relatively small and this tight curling action will promote early breakage.

Referring to FIG. 6 the helical blade 25 is shown removed from its holding slot and lying across the axis 76 of the tool body. At any station along its length from distal end 31 to proximal end 32, a straight line perpendicular to top edge 33 and lower edge 34 and lying within the front face will intersect axis 76. The row of clamps 35, 77, 78 and 47 are shown exploded laterally away from blade 25. As viewed from above the clamps appear to tilt or rotate by equal angular increments in a given direction.

OPERATION

Keeping the above construction in mind it can be understood how the previously described disadvantages of conventional art helical blade milling cutters are overcome or substantially eliminated by the present invention.

In order to fully assemble helical blade milling cutter 10 for use, while it is positioned on or separated from its associated milling machine spindle, the machinist slips the six helical blades 25, 26, 27, 28, 29 and 30 endwise along spiral paths into their selected holding slots 13, 14, 15, 16, 17, and 18 respectively. The clamps such as clamp 35 are positioned in the six rows of retaining sockets formed in the equidistantly and angularly spaced fluted sections 20.

As the machinist torques wrench 72 in the correct direction the upper threaded section 68 of double threaded adjustment screw 67 interengages with the block threaded opening 60 and simultaneously lower threaded section 69 interengages more deeply with threaded bore 71 of socket 21. Eventually, due to the geometry of clamp 35 and socket 21, cylindrical block 59 will be cammed and urged against blade 25 with increasing force. When tapered locking ribs 62 and 63 exert sufficient clamping pressure against the concealed lower portion of blade cutting face 75 a two-point or two line clamping engagement will be established to securely hold blade 25 in its slot 13.

In order to release the clamping pressure on blade 25 for removal and possibly replacement purposes wrench 72 maybe twisted in the opposing direction.

As previously indicated the angles B of locking ribs 62 and 63 may be slightly varied to accommodate the gradually changing curvature of the blade 25 and accomplish a more effective two line contact.

From the foregoing, it will be evident that the present invention has provided a helical milling cutter in which all of the various advantages are fully realized.

What is claimed is:

1. A helical blade milling cutter comprising:
   a. a tool body having a longitudinal axis, a plurality of spirally aligned holding slots formed equidistantly in the tool body periphery, and a plurality of fluted sections formed adjacent corresponding holding slots;
   b. a row of at least two retaining sockets formed in each fluted section with the sockets opening into a corresponding holding slot, each socket having an outer enlarged diameter bore and an inner smaller tapped bore,
   c. multiple helical shaped cutter blades inserted in corresponding holding slots, each blade being configured so that any any point along its end-to-end length a straight line oriented perpendicular to the blade top edge and laying across the blade cutting face will intersect the tool body longitudinal axis, and,
   d. clamps arranged in each retaining socket, each clamp including:
      d 1. a cylindrically shaped block formed with a centrally extending threaded opening and a wedge shaped face characterized by a pair of tapered locking ribs separated by a shallow recess,
      d 2. an adjustment element whose axis intersects the tool body longitudinal axis, the adjustment element being constituted by a double threaded screw having a top section with threads oriented in one direction for engagement with the block threaded opening, and, a lower section with threads oriented in the opposite direction for engagement with the socket tapped bore, the adjustment element being positioned to simultaneously force the block into its socket and urge the locking ribs into tight clamping two-point engagement against the associated blade;
   e. a clamp-blade angle defined by each adjustment element axis and intersecting straight line associated with an adjacent blade segment is between 7° and 15°, and,
   f. the angle defined by one locking rib with the axis of its associated adjustment element is slightly greater than the clamp-blade angle, and, the angle defined by the other locking rib with the axis of its associated adjustment element is slightly less than the clamp-blade angle so that improved two-line contact may be established against the blade,
   wherein by arranging the axes of adjustment elements and said straight lines passing through the blade cutting faces to mutually intersect at the tool body longitudinal axis, improved stability of the overall helical blade milling cutter is achieved.

* * * * *